Aug. 24, 1954     O. E. SEIFERTH     2,686,929
PACKAGING FIXTURE
Filed Oct. 21, 1950     2 Sheets—Sheet 1
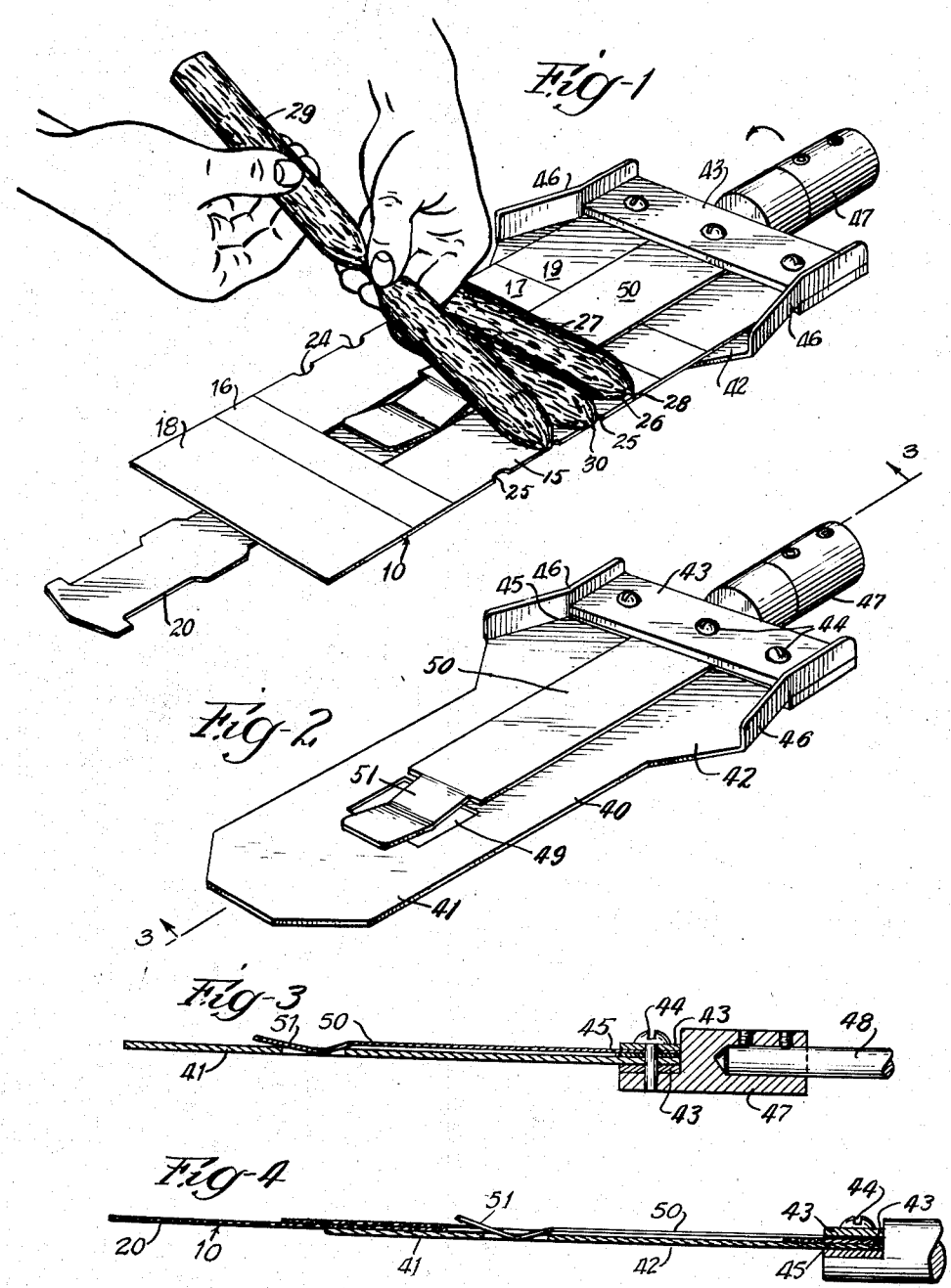
INVENTOR.
Oscar E. Seiferth.
BY
Cromwell, Greist & Warden
Attys.

Aug. 24, 1954  O. E. SEIFERTH  2,686,929
PACKAGING FIXTURE
Filed Oct. 21, 1950
2 Sheets—Sheet 2
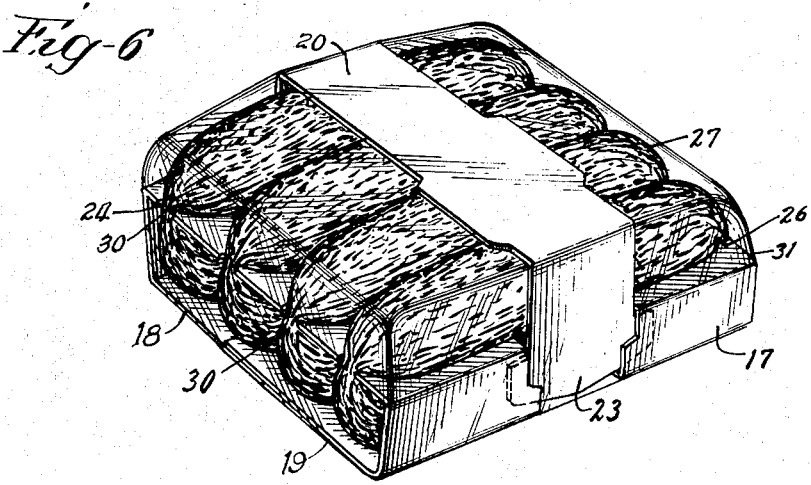
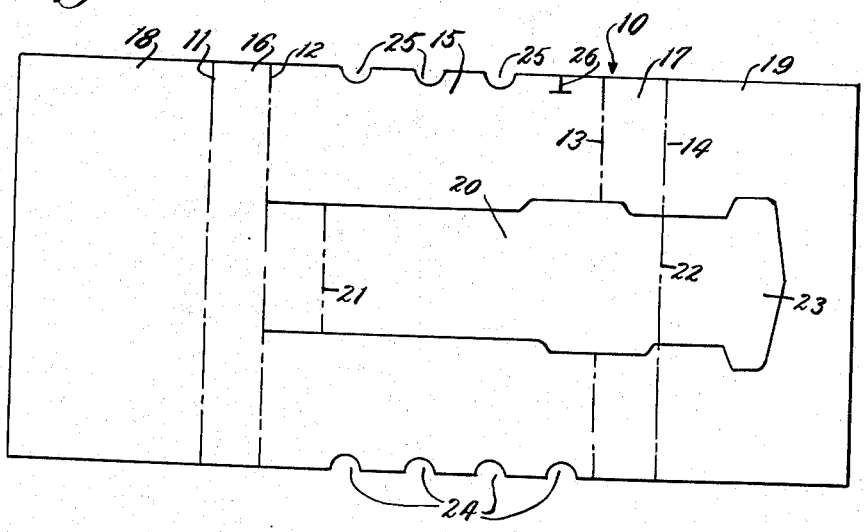
INVENTOR.
Oscar E. Seiferth
BY
Cromwell, Greist & Warden
Attys Patented Aug. 24, 1954

2,686,929

UNITED STATES PATENT OFFICE 2,686,929

PACKAGING FIXTURE

Oscar E. Seiferth, Madison, Wis., assignor to Oscar Mayer & Co., Inc., Chicago, Ill., a corporation of Illinois Application October 21, 1950, Serial No. 191,366

4 Claims. (Cl. 17—34)

This invention relates to packaging and is more particularly concerned with the fabrication of a package containing a plurality of connected links of sausage or a similar product, arranged in side-by-side relation alternately on opposite sides of a paperboard backing member which is folded to hold the links thereon in compact relation.

It is a general object of the invention to provide means for forming a neat and compact package containing a predetermined quantity of sausage or a similar product, whereby the sausage is formed into links which are assembled in side-by-side relation on opposite sides of a paperboard backing member, and the backing member is thereafter folded to partially enclose the sausage links and to retain the links in assembled relation thereon.

It is a more specific object of the invention to provide means for forming a package of link sausages comprising a fixture on which a paperboard backing member is adapted to be supported, which backing member is cut and creased to provide a plurality of panels, with an intermediate panel being adapted to receive on opposite sides thereof a plurality of links of sausage and with the other panels forming wall members which are adapted to be folded around the sausages on opposite faces of the intermediate panel, whereby the sausage links are formed from a predetermined length of filled sausage casing by rotating the fixture while simultaneously dividing the casing manually into successive links and arranging the links in side-by-side relation alternately on opposite faces of the intermediate panel.

It is a further object of the invention to provide means for forming a package of link sausages whereby a predetermined weight of sausage meat may be divided into connected links and arranged with the links in juxtaposed relation on opposite sides of an intermediate portion of a paperboard backing member, the backing member being provided with a cut-out strap portion which is folded in confining relation over the outer face of the sausages on one side of the package and the terminal end portions of the backing member being folded over the sausages on the other side of the package in side wall and bottom enclosing relation with one of the side wall forming portions being interlocked with the end of the strap portion.

It is another object of the invention to provide a plate-like fixture member for use in forming a package of link sausages in which the fixture member is rotatably mounted and is adapted to support a paperboard backing member in such a manner that an operator is able to form links in a length of filled sausage casing and by rotating the fixture arrange the links on opposite sides of the backing member.

It is still another object of the invention to provide a relatively flat elongate fixture plate having means for receiving in supporting relation thereon a paperboard backing member and means for rotatably mounting the fixture plate so that a predetermined length of filled sausage casing may be wound around the same with the operator dividing the casing into links of substantially uniform length, corresponding approximately to the width of the backing member, while imparting a twist to the casing between successive links, the connected links being positioned alternately on opposite faces of the fixture plate and in parallel relation extending crosswise of the backing member.

It is another object of the invention to provide a mechanism for use in forming a package of the type described wherein the backing member is supported on a rotatable fixture plate, the sausage links are formed and rotated to impart a twist in the casing between adjacent links while at the same time the links are assembled with the backing member, the assembled backing member and links are removed from the fixture plate, the wall forming panels of the backing member are folded around the links and finally a transparent sheet material is wrapped around the same to retain the links and the backing member in assembled relation while permitting visual inspection of a substantial portion of the sausage.

These and other objects of the invention will be apparent from a consideration of the method of packaging and the fixture for use with the same which are illustrated in the accompanying drawings, wherein:

Fig. 1 is a perspective view illustrating certain steps in a method of packaging which incorporates the principal features of the invention;

Fig. 2 is a perspective view of a fixture adapted to be used in carrying out the method;

Fig. 3 is a longitudinal section through the fixture taken on line 3—3 of Fig. 2;

Fig. 4 is a longitudinal section similar to Fig. 3 but with the backing member for the package in position thereon;

Fig. 5 is a plan view of a blank cut and scored to provide the backing member for the package; and Fig. 6 is a perspective view of the completed package.

Referring to the drawings, there is illustrated in Fig. 5 a generally rectangular blank 10 of paperboard or similar material which is adapted to form a backing and reinforcing member for the package which is illustrated in Fig. 6.

The blank 10 is divided by longitudinally spaced, generally parallel, transverse score lines 11, 12, 13 and 14, into a relatively large central panel 15, relatively narrow adjoining panels 16 and 17, and end panels 18 and 19. The central panel 15 forms an intermediate backing member for the package contents, the narrow panels 16 and 17 form side walls of the package and the end panels 18 and 19 are overlapped to form a bottom wall of the package. The blank 10 is also die-cut centrally to provide a foldable strap member 20 which extends from the crease line 12, through the panels 15 and 17 and into the end panel 19. The strap member 20 is provided with transverse score lines 21 and 22, the former being spaced from the score line 12 a distance approximately equal to the distance between the score lines 11 and 12 and the latter being aligned with the score line 14. The strap 20 is provided at the free end with an enlarged tab formation 23, the terminal edge of which is spaced from the transverse score line 22 approximately twice the distance between the score lines 13 and 14. The central panel 15 is provided along one longitudinal or outer edge with a plurality of longitudinally spaced relatively shallow recesses 24 and along the opposite outer edge with similarly spaced recesses 25 and a T-shaped slot 26, the latter being substituted for one of the recesses 25 at one corner of the panel 15.

The central panel 15 is adapted to support on its opposite faces a plurality of connected link sausages 27 (Fig. 6) which are arranged in generally parallel transversely extending relation on both faces of the panel 15, alternate sausages 27 being arranged on opposite faces of the panel. The connected sausages are arranged with the free end 28 of the casing 29 engaged in the T-shaped slot 26 and the connecting areas 30 between the sausages 27 arranged in the recesses 24 and 25 to properly position the sausages 27 on the panel. The blank is folded to bring the panels 16 and 17 into approximately right angled relation with the panel 15 and to bring the end panels 18 and 19 in overlapping relation over the outer face of the row of sausages 27 which is arranged on one side of the panel 15. The strap 20 which is folded back about the crease line 12 before the sausages 27 are positioned on the panel 15 is folded about the outer face of the row of sausages 27 on the other side of the panel 15 with the tab end 23 engaged in the slot formed by cutting out the strap 20 in the panel 17 to hold the sausages on that side of the panel 15 in position thereon. The entire assembly of backing member 10 and sausages 27 is enclosed in an outer transparent wrapper 31. For a more complete description of the package reference may be had to applicant's co-pending application Serial No. 155,512, filed April 12, 1950 now Patent No. 2,646,357, issued July 21, 1953.

The package may be conveniently formed or assembled with the use of the fixture 40 which is illustrated in Figs. 1, 2 and 4 and which comprises a supporting plate member having a generally rectangular outer portion 41 and a widened base portion 42. The base 42 is secured between a pair of end cross plates 43 by screws 44. An intermediate end plate 45 which is approximately the thickness of the backing member 10 extends between the top end plate 43 and the base portion 42 of the supporting plate with an edge thereof forming an end abutment or stop member. The base portion 42 is provided at the side edges with relatively narrow upstanding flanges 46 which are in opposed relation and which have outwardly flared portions extending toward the free end portion 41 of the fixture. The base portion 42 of the fixture 40 is secured to a short stub shaft 47 which is adapted to be mounted on a rotating member such as the driven shaft 48 (Fig. 3) of a motor (not shown) which is electrically connected with a suitable switch under the control of the operator. The outer plate portion 41 is provided with a relatively small cut out opening 49 of generally rectangular shape and a relatively narrow clamping plate 50 extends from the cross plates 43 to the opening 49 with a small end section 51 of reduced width and having a reverse bend intermediate its ends adapted to be moved into the opening 49.

In assembling the sausages 27 on the panel 15 the blank 10 is arranged on the fixture 40 in face-to-face relation with the plate sections 41 and 42, after the strap 20 has been bent back about the crease line 12 to extend outwardly of the outer end of the blank, as shown in Fig. 1, with the opposite end of the blank in abutting relation with the transverse edge of the plate 45. The clamping plate 50 extends out over the major portion of the blank with the reversely bent end section 51 adapted to move through the slot in the blank which is left by bending back the strap 20 and into the opening 49 in the plate section 41.

With the supporting blank 10 arranged on the fixture 40 in the position described the operator first engages the loose end 28 at one end of a predetermined length of filled casing 29 in the T-shaped slot 26 in the panel 15. The operator then divides off the first sausage 27 and twists the remainder of the casing 29 to provide a separating twist 30 between it and the next sausage 27 to be formed. The length of the sausage link 27 is made approximately the width of the panel 15. The fixture 40 is then rotated to bring the opposite face of the blank supporting plate uppermost, the sausage link which has been formed being arranged on the panel 15 with the twisted portion 30 of the casing arranged in the recess 24 opposite the T slot 26. The operator measures off a second sausage 27 and twists the remainder of the casing to provide a separating twist 30 between it and the next succeeding sausage. The second sausage link is positioned on the panel 15 and the fixture 40 is again rotated to bring the opposite face uppermost. This procedure is continued until all of the filled casing 29 has been divided into individual sausage links 27 and placed on the panel 15 with alternate sausages in row forming relation on opposite faces of the panel 15. Thereafter the blank 10 is removed from the fixture 40 and the panels 16, 17, 18 and 19 and strap 20 are folded around the two rows of sausages 27 to provide the package formation shown in Fig. 6. The package is completed by wrapping the assembly thus formed in an outer transparent wrapper 31. Before the outer wrapper 31 is applied the weight of the package is checked and if insufficient an additional link of the required size may be placed at the end of the bottom row where it will be substantially covered by the folded portions of the blank.

While the method of simultaneously forming and assembling the connected sausages 27 on the blank 10, as described, is preferred, it will be understood that substantially the same package may be formed by winding on the blank a plurality of preformed sausage links of the proper size and weight.

I claim:

1. A fixture for supporting for rotation an apertured article receiving blank, which fixture comprises a relatively thin generally rectangular frame forming member, said frame forming member being adapted to receive in face engaging relation thereon said article receiving blank, means at one end of said frame forming member for mounting the same for rotation about its longitudinal axis, and a resilient clamping arm mounted adjacent one end of said frame forming member and having a free end portion extending toward the other end thereof, said frame forming member having an aperture aligned with the free end portion of said clamping arm and said clamping arm being shaped at its free end portion to extend into the aperture in said frame forming member, whereby said clamping arm is adapted to hold said article receiving blank against transverse movement relative to said frame forming member by engagement of the free end portion thereof in the aperture in said article receiving blank when said article receiving blank is supported on said fixture.

2. A fixture for supporting a generally rectangular blank while winding thereabout a predetermined length of filled sausage casing and simultaneously forming the casing into a plurality of individual sausage links with the links being positioned in row forming relation on opposite faces of the blank, said blank being characterized by a generally rectangular central portion cut out along three edges and adapted to be bent back along the fourth edge providing a generally rectangular aperture extending lengthwise of the blank, said fixture comprising a relatively thin generally rectangular plate member, means at one end of said plate member for mounting the same for rotation about its longitudinal axis, an abutment ledge extending transversely across the end of the plate member, and a relatively thin generally rectangular elongate spring clip extending from said abutment ledge along one surface of said plate member, said plate member having an aperture therein spaced from said abutment ledge and said spring clip being positioned to extend across said aperture in said plate member with a portion intermediate the ends thereof being shaped to project laterally into said aperture, whereby when said blank is positioned between said plate member and said spring clip with one end thereof against said abutment ledge, the laterally extending portion of said spring clip will extend through said lengthwise aperture in said blank and said blank will be restrained against sidewise shifting movement relative to said plate member during the winding thereon of the sausage casing and the forming of the sausage links.

3. A fixture for supporting a generally rectangular blank while winding thereabout a predetermined length of filled sausage casing and simultaneously forming the casing into a plurality of individual sausage links with the links being positioned in transversely extending relation on opposite faces of the blank, said blank being characterized by a generally rectangular central portion cut out along three edges and adapted to be bent back along the fourth edge to provide a generally rectangular aperture extending lengthwise of the blank, said fixture comprising a relatively thin, flat, generally rectangular plate member, means intermediate the side edges at one end of said plate member for mounting the same for rotation about its longitudinal axis, an abutment ledge extending transversely at said one end of the plate member, and a generally rectangular elongate spring clip extending from said abutment ledge a predetermined distance along one face of said plate member, said plate member having an aperture intermediate its ends and said spring clip having an end portion which projects laterally of the plane of the body thereof and into the aperture in the plate member, said end portion of said spring clip being of substantially the same width as the aperture in said blank, whereby when said blank is supported on said fixture the side edges of the end portion of the spring clip will engage the edges defining the aperture in said blank and thereby lock the blank on the plate member and prevent lateral movement thereof.

4. A fixture for supporting a generally rectangular blank for winding thereabout a predetermined length of filled sausage casing and simultaneously forming the casing into a plurality of individual sausage links of a length corresponding to one dimension of said blank, said blank being characterized by a generally rectangular central portion cut out along three edges and adapted to be bent back along the fourth edge to provide a generally rectangular aperture extending lengthwise thereof, said fixture comprising a relatively thin flat generally rectangular plate member, means intermediate the side edges at one end of said plate member for mounting the same for rotation about its longitudinal axis, an abutment ledge extending transversely at said one end of the plate member, and a generally rectangular elongate spring clip extending from said abutment ledge a predetermined distance along one face of said plate member, said plate member having an aperture intermediate its ends and said spring clip having an end portion which projects laterally of the plane of the body thereof and into the aperture in the plate member, said end portion of said spring clip being of a width corresponding substantially to the width of the aperture in the blank, and said plate member having relatively short flange formations along opposite side edges at said one end thereof which flange formations extend in outwardly tapered relation from said abutment ledge, whereby said blank may be supported on said fixture by positioning one end of the same between said plate member and said spring clip with the end of said blank engaging said abutment ledge and with the laterally projecting end portion of said spring clip engaging in the aperture in the blank and preventing lateral movement thereof relative to said plate member.

References Cited in the file of this patent

UNITED STATES PATENTS

| Number | Name | Date |
|---|---|---|
| 786,049 | Naylor | Mar. 28, 1905 |
| 1,141,646 | Marcouillier | June 1, 1915 |
| 2,228,451 | Gilfillan | Jan. 14, 1941 |
| 2,352,645 | Liebmann | July 4, 1944 |
| 2,379,935 | Seiferth et al. | July 10, 1945 |
| 2,551,288 | Prohaska | May 1, 1951 |

FOREIGN PATENTS

| Number | Country | Date |
|---|---|---|
| 30,285 | Great Britain | A. D. 1909 |